US012268186B2

(12) United States Patent
Ryan

(10) Patent No.: US 12,268,186 B2
(45) Date of Patent: Apr. 8, 2025

(54) PET TETHER

(71) Applicant: Scott Ryan, Waukesha, WI (US)

(72) Inventor: Scott Ryan, Waukesha, WI (US)

(*) Notice: Subject to any disclaimer, the term of this patent is extended or adjusted under 35 U.S.C. 154(b) by 9 days.

(21) Appl. No.: 18/338,921

(22) Filed: Jun. 21, 2023

(65) Prior Publication Data
US 2023/0413780 A1 Dec. 28, 2023

Related U.S. Application Data

(60) Provisional application No. 63/354,842, filed on Jun. 23, 2022.

(51) Int. Cl.
A01K 1/04 (2006.01)
A01K 27/00 (2006.01)

(52) U.S. Cl.
CPC ...................... A01K 1/04 (2013.01)

(58) Field of Classification Search
CPC ................ A01K 1/04; A01K 27/004
USPC .................. 119/786–787, 795–798
See application file for complete search history.

(56) References Cited

U.S. PATENT DOCUMENTS

| 49,492 A | 8/1865 | Avery |
| 66,417 A | 7/1867 | Thorn |
| 174,407 A * | 3/1876 | Boyles ................ A01K 1/04 |
| | | 119/785 |
| 184,663 A | 11/1876 | Reichert |
| 209,783 A * | 11/1878 | Warlow ................ A01K 1/04 |
| | | 242/157 R |
| 215,730 A | 5/1879 | Fox et al. |
| 223,872 A | 1/1880 | Ashford |
| 226,014 A | 3/1880 | Angell |
| 350,277 A | 10/1886 | Taylor |
| 353,750 A * | 12/1886 | Kirby ................... A01K 1/04 |
| | | 119/782 |
| 550,620 A | 12/1895 | Jones |
| 601,952 A | 4/1898 | Day |
| 636,020 A | 10/1899 | Whorley |
| 636,407 A | 11/1899 | Hudson |
| 819,561 A | 5/1906 | Laws |
| 1,060,439 A | 4/1913 | Duxstad |
| 2,360,199 A | 10/1944 | Cawley |
| 2,472,926 A | 6/1949 | Sullivan |
| 2,507,383 A | 5/1950 | Schiel et al. |
| 2,725,853 A * | 7/1952 | Nordheim ............ A47D 13/086 |
| | | 119/789 |
| 3,123,052 A | 3/1964 | Marshall |
| 3,716,029 A * | 2/1973 | Pillsbury, Jr. ........ A01K 15/027 |
| | | 119/701 |
| 3,806,094 A | 4/1974 | Harken |
| 4,453,486 A | 6/1984 | Harken |
| 4,656,967 A | 4/1987 | Duksa |

(Continued)

FOREIGN PATENT DOCUMENTS

GB 2604241 8/2022

Primary Examiner — Morgan T Jordan
Assistant Examiner — Kari A Bradberry
(74) Attorney, Agent, or Firm — RYAN KROMHOLZ & MANION, S.C.

(57) ABSTRACT

Disclosed is a 360° rotatable pet tether with the ability to remotely control a radius of freedom of travel for an attached pet. A rope can be retracted remotely in order to shorten the radius of freedom of travel for the pet, or extended to lengthen the radius of freedom of travel for the pet.

20 Claims, 12 Drawing Sheets

(56) References Cited

U.S. PATENT DOCUMENTS

| | | | | |
|---|---|---|---|---|
| 4,738,222 | A | * | 4/1988 | Terry ................. A01K 1/04 |
| | | | | 119/781 |
| 4,747,372 | A | | 5/1988 | Terry et al. |
| 4,766,848 | A | * | 8/1988 | Rocco ................. A01K 1/04 |
| | | | | 119/701 |
| 4,813,627 | A | | 3/1989 | Nelson |
| 5,031,577 | A | | 7/1991 | Flugger |
| 5,213,063 | A | * | 5/1993 | Franck, III .......... A01K 1/04 |
| | | | | 119/785 |
| 5,437,246 | A | | 8/1995 | Noles |
| 5,732,659 | A | | 3/1998 | Wiggins |
| 6,305,669 | B1 | | 10/2001 | Harken et al. |
| 7,222,590 | B2 | | 5/2007 | Haddad |
| 7,353,780 | B2 | | 4/2008 | Bean |
| 7,673,588 | B2 | | 3/2010 | Head |
| 7,866,282 | B2 | | 1/2011 | Simpson et al. |
| 7,984,698 | B1 | | 7/2011 | Collins |
| 8,307,789 | B2 | * | 11/2012 | Stuerke ................ A01K 1/04 |
| | | | | 119/791 |
| 10,485,222 | B2 | | 11/2019 | Skinner |
| 2007/0137588 | A1 | | 6/2007 | Bean |
| 2007/0215064 | A1 | | 9/2007 | Petersen |
| 2008/0000430 | A1 | | 1/2008 | Petersen |
| 2008/0072845 | A1 | | 3/2008 | Head |
| 2011/0120389 | A1 | | 5/2011 | Yackley |
| 2015/0164042 | A1 | * | 6/2015 | Moore ................. A01K 1/04 |
| | | | | 119/796 |
| 2015/0173326 | A1 | | 6/2015 | Pittman |
| 2016/0152453 | A1 | * | 6/2016 | Wescott ............... B66D 3/04 |
| | | | | 248/343 |
| 2018/0092333 | A1 | * | 4/2018 | Skinner ............. A01K 27/005 |
| 2022/0030826 | A1 | | 2/2022 | Wilson et al. |

\* cited by examiner

TO/FROM HOUSE

PET TETHER

BACKGROUND OF THE INVENTION

It is no fun letting a dog out in the cold or rain, then having to go out and untangle a dog leash from around a tree or furniture. It is also no fun for pet owners with mobility issues to have to travel outside a threshold of their house or outside to untangle their pet.

The present invention relates to an animal tether or tie-out for an animal such as a dog. More specifically, the invention aims to solve the problem of tangling the leash around objects such as trees and furniture, and controlling where a tethered pet can roam.

Pet tethers are known in the art. U.S. Pat. No. 49,492 discloses a vertical stake carrying a revolving beam which in turn carries two pulleys, the leash extending about the two pulleys and to the animal. U.S. Pat. No. 66,417 discloses a pair of legs, each leg carried by a fork of a fixed caster base structure, and a reel carried between the legs. Other rotating tie-outs, and tie-outs carrying pulley structures are disclosed in the prior art.

SUMMARY OF THE INVENTION

The present invention provides for a 360° rotatable pet tether with the ability to remotely control a radius of freedom of travel for the pet. A rope, cable, chain, strand, thread, braid, and any flexible member or the like (the term rope will be used throughout and in the claims to include all these structures and anything equivalent), can be attached to an animal and retracted remotely, such as from inside or near a house, in order to shorten the radius of where the pet can travel in relation to the pet tether when the pet leashed (radius of freedom of travel). With the present invention, one can control the radius of freedom of travel by simply pulling on the rope or feeding out rope to the pet tether after hooking the rope onto the pet, in order to decrease or increase, respectively, the radius of freedom of travel.

Disclosed is a pet tether or tie-out preferably using two rope carrying structures, such as pulley wheels or a reels or spools (the terms will be used interchangeably), the rope carrying structures or pulleys attached to a vertically extending support structure such as a tube, or a leg or pair of legs. The support structure may be carried by a fork carried by a base structure, the base structure staked to the ground or a secondary base structure staked to the ground.

A first pulley is carried by the vertically extending support structure, preferably anchored to, within or carried between the legs of the vertically extending support structure, or a tube. A second pulley is situated atop the vertically extending support structure, for instance carried between forks of a pivoting or rotating caster wheel such that the caster wheel will automatically align itself to the animal's direction of travel while avoiding tangling of the leash carried by the second pulley within the caster. The caster wheel may be carried by a mounting plate coupled to the support structure. A caster base plate, a yoke and the mounting plate of the caster wheel assembly preferably each have holes drilled therethrough to accommodate the rope between the pulleys.

A rope extends from a base point such as a user's house, to the pet tether, up and about the first pulley carried by the support structure, through the rotatable yoke and mounting plate, about the second pulley carried by the rotating caster, to the pet (the pet preferably carrying a collar pulley coupled to a carabiner), and optionally but preferably returning to and terminating at a portion of the pet tether such as the rotatable caster.

Pulling on the rope from its base point controls the pet if the pet resists coming out into the yard from the house, thereby shortening the radius of freedom of travel.

A dome and cap assembly may be provided to shield elements of the pet tether from outside elements.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
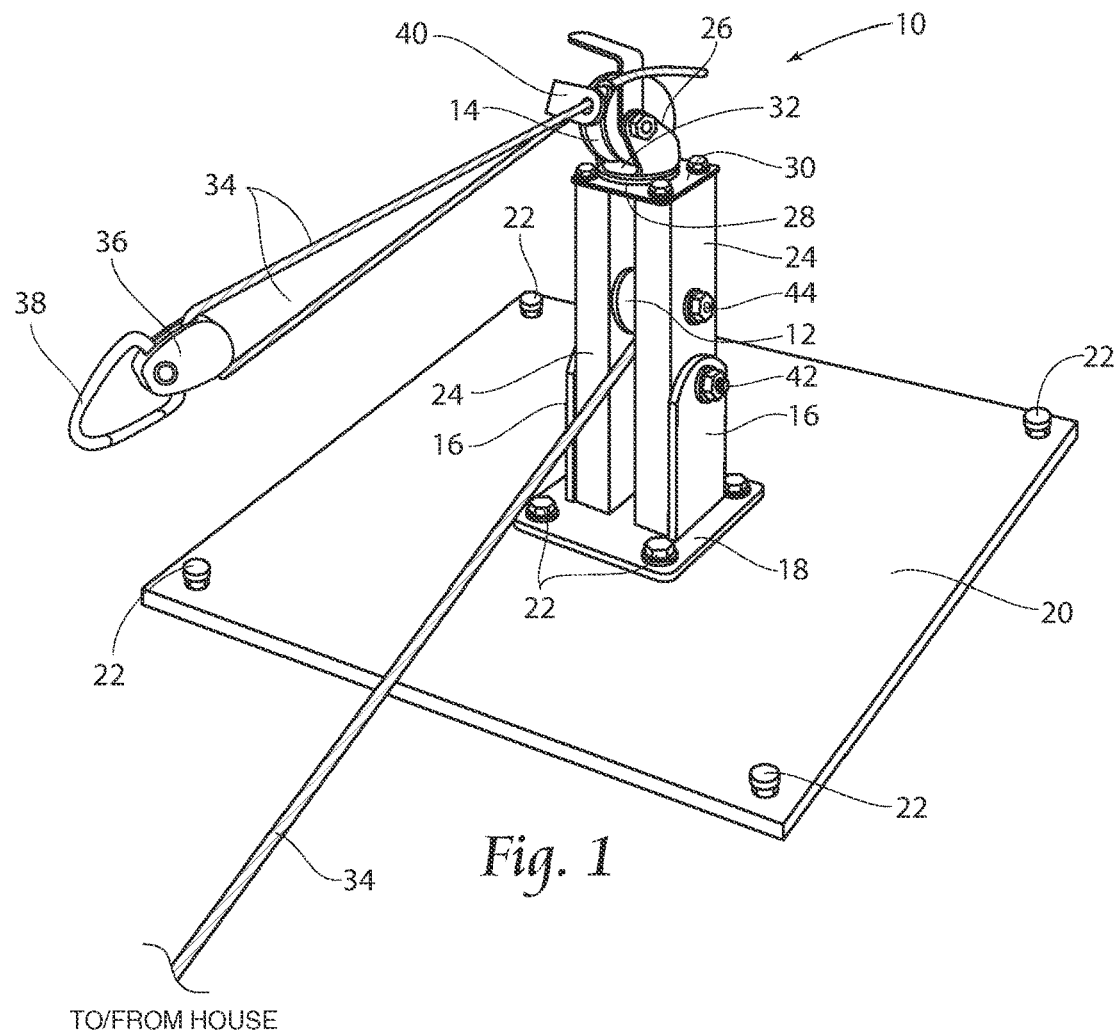
FIG. 1 is a perspective view of a pet tether of the present invention.

Referring now to FIG. 1, a perspective view of a pet tether or tie-out 10 of the present invention is shown. Disclosed is the pet tether 10 using first and second rope guides or pulleys 12 and 14, which are preferably pulley wheels (and will be described as such below), the pulleys 12 and 14 attached to one or more legs 24, legs 24 in turn carried by a fork 16, for instance by bolts 44 or the like. Fork 16 is carried by or formed with a base structure 18, the base structure 18 staked to the ground or a secondary base structure 20, either base structure 18 or 20 staked to the ground by stakes 22.

Base structure 18 or secondary base structure 20 can have hand grips (not shown) at any point on their edges or sides, or about any of the stakes 22 to easily lift the pet tether 10 from the ground. Base structure 18 or secondary base structure 20 can have hand width openings (not shown) on or proximal to one or more edges to be used as a carrying handles. Base structure 18 may be molded with integral spikes 22 (not shown), which can be manually pushed into the ground.

First pulley 12 is carried by legs 24, first pulley 12 preferably carried by or between the legs 24, and preferably (though not necessarily) rotatable about bolt/axle 42. Second pulley 14 is situated atop legs 24, carried in the middle of rotating caster forks 26 of a pivoting or rotating caster wheel assembly 28 such that the rotating caster wheel assembly 28 will automatically align itself to the animal's direction of travel while avoiding tangling of the rope carried by the pulley 14 within the caster 28. The rotating caster wheel assembly 28 is carried by a mounting plate 30 coupled to legs 24. A yoke 32 and the mounting plate 30 of the caster wheel assembly 28 preferably have holes drilled therethrough (visible in FIG. 9) to accommodate rope 34 such that rope 34 can travel between first pulley 12 and second pulley 14. An additional pet pulley 36 may be provided if desired to provide mechanical advantage against the weight of the pet, as will be described later.

A rope 34 extends at a beginning end from a convenient location such as from a house of the user, to pet tether 10 (first rope length); up and about the first pulley 12 carried by the vertical legs 24, through the holes formed in mounting plate 30 and rotatable yoke 32, about the second pulley 14 within the rotating caster assembly 28 (second rope length); to the pet (not shown in FIG. 1) (third rope length) via a collar pulley 36 coupled to a swivel-eye bolt snap hook or carabiner 38, and returning to and terminating at the pet tether 10 (fourth rope length), for instance at rotatable caster 28. In a preferred embodiment, a tie-off tab 40 is coupled to one of the components of the pet tether 10, such as caster fork 26 as shown, or the caster base plate 30, caster yoke 32, leg 24, or second pulley 14.

The pet tether 10 can be provided in a variety of colors, and a nameplate (not shown) can be included thereupon.

Figure 2:
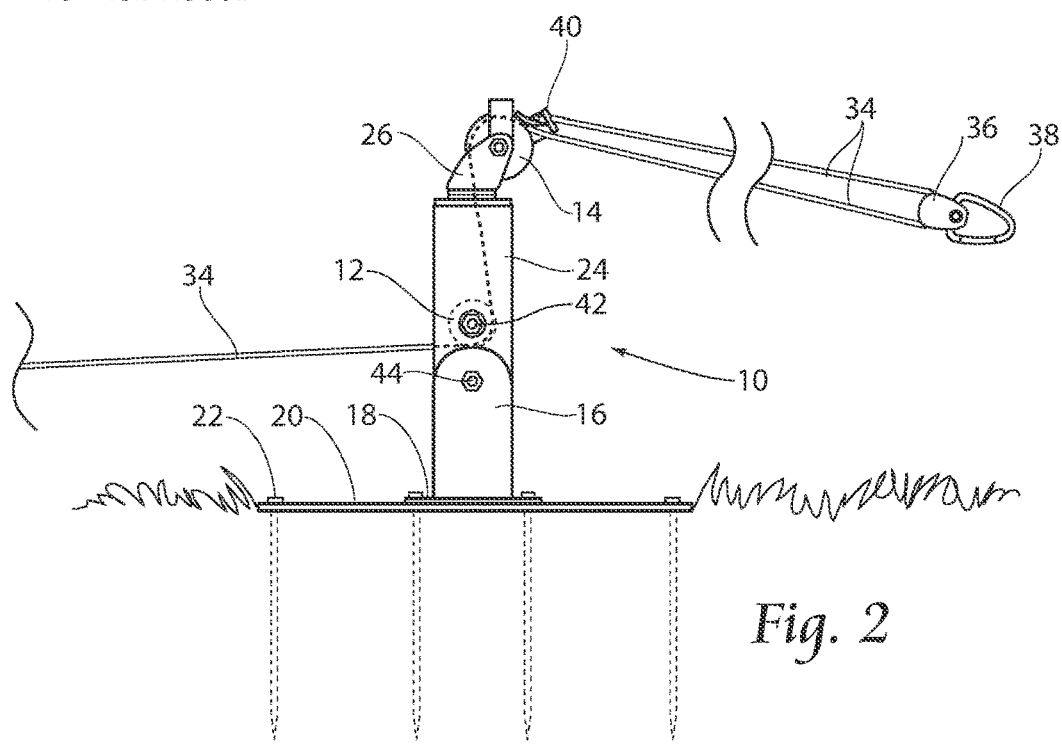
FIG. 2 is a side view thereof.

Referring now to FIG. 2, a side view of the pet tether 10 of FIG. 1 is shown. In a preferred embodiment, rope 34 is carried about pet pulley 36, in turn coupled to carabiner 38 which is then attached to the pet (pet not shown).

Figure 3:
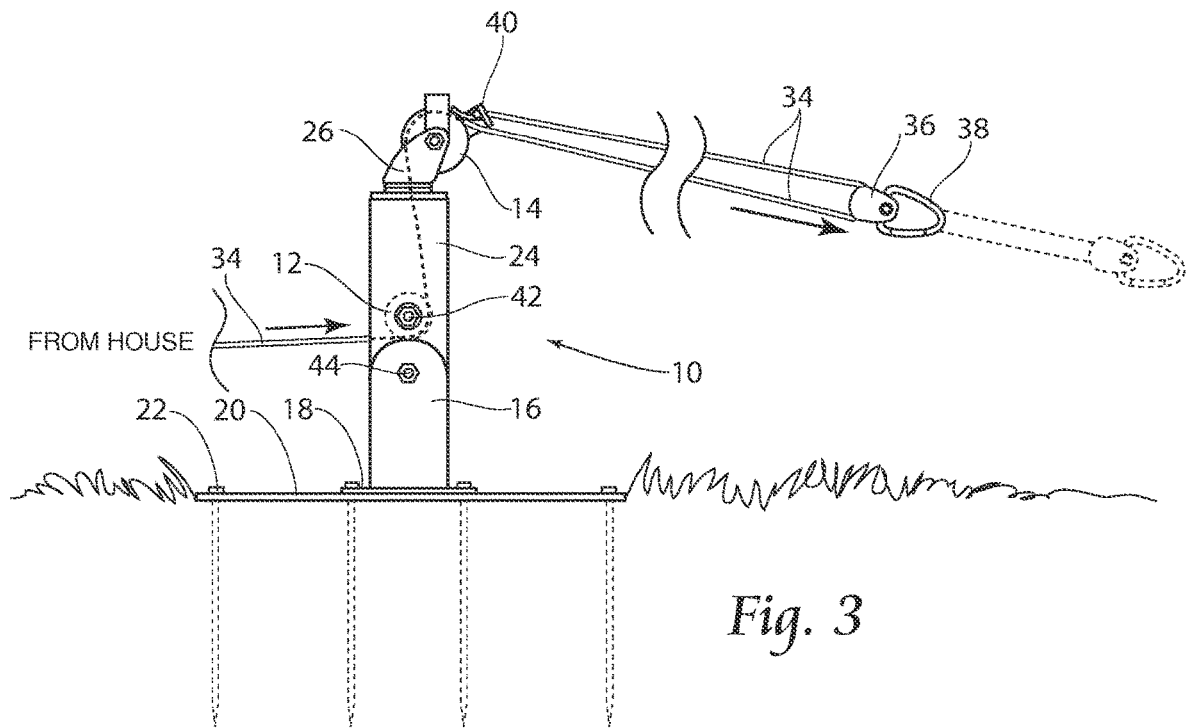
FIG. 3 is a side view thereof.

When the pet moves away from the pet tether 10 (if allowed), as depicted in FIG. 3, rope 34 is fed out from pulley 14 allowing the pet to move away from pet tether 10. This action also pulls rope 34 away from the starting point of the rope (such as the house).

Figure 4:
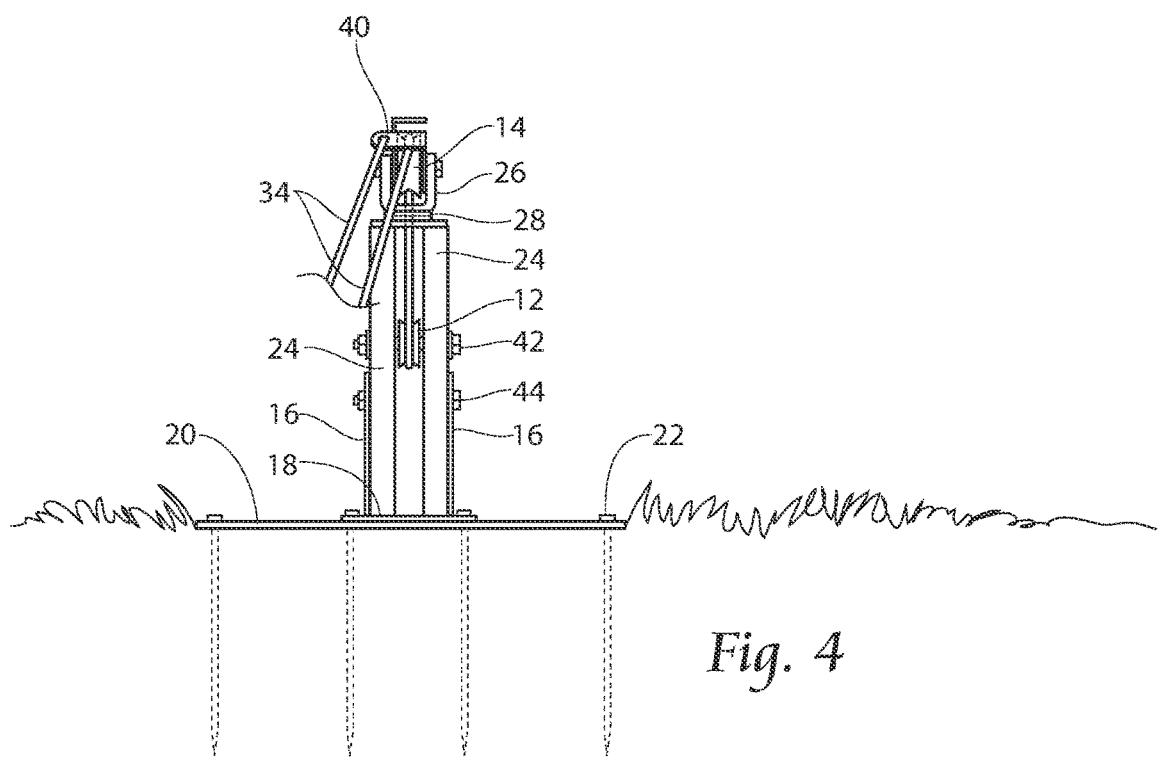
FIG. 4 is a rear view thereof.
Figure 5:
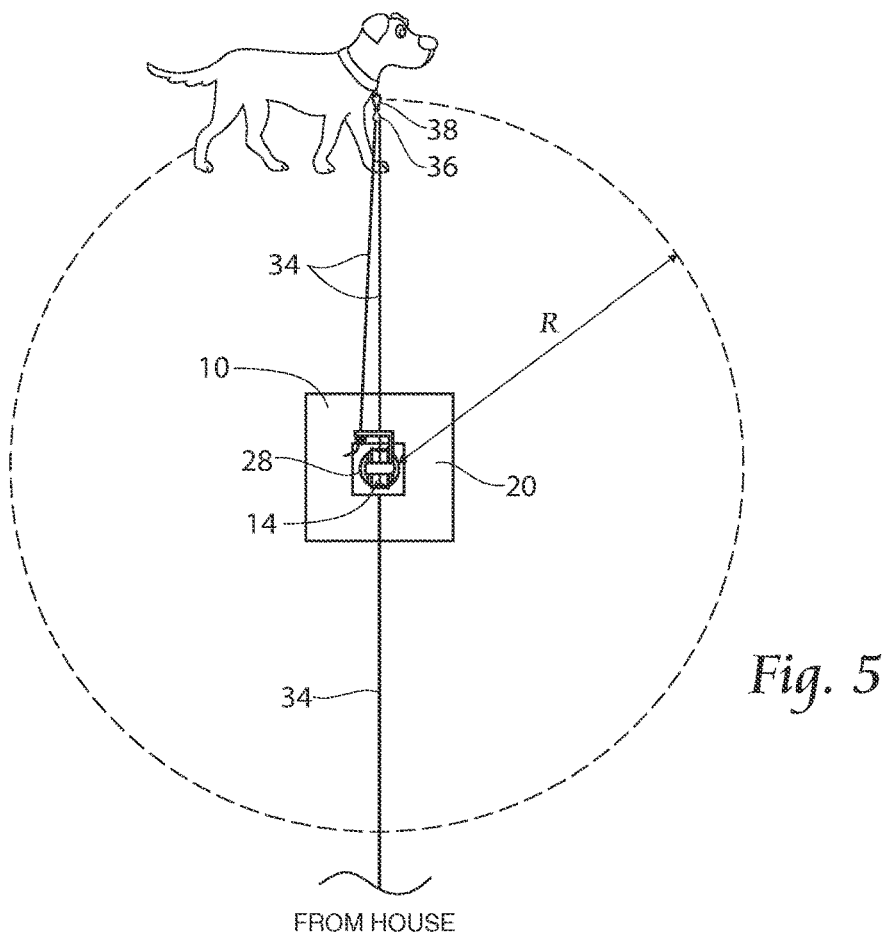
FIG. 5 is a top view thereof, the pet tether coupled to a pet such as a dog.

Referring to FIGS. 4 and 5, a rear view and a top view, respectively, of the pet tether 10 of FIG. 1 is shown. As can be seen in FIG. 5, the length of rope 34 between pet tether 10 and the pet (or in particular the carabiner 38) defines a radius of freedom of travel R for the pet. Referring now to and comparing FIGS. 5 and 6, it can be seen that the action of a dog walking about pet tether 10 (causing the third and fourth rope 34 segments, between the pet and the pet tether 10, to rotate about pet tether 10) causes rotating caster assembly 28 to rotate to automatically align itself to the animal's position while avoiding tangling of the rope carried by the pulley 14 within the rotating caster assembly 28.

Preferably the first length of rope 34 between the house and pet tether 10 is at or near ground level in order to prevent the pet from tripping, and avoiding possible entanglements with the rope 34. Stakes, a ground pulley on a spike, rope guides or the like (not shown) can be provided to guide rope 34 and to make sure rope 34 remains at ground level. An additional pulley attached to a deck or house or other fixture (not shown) can also be used in this system. Additionally, beginning end of rope 34 can run through a cleat or cam cleat to allow adjustment of the radius of freedom of travel R, then rope 34 can be locked back in place.

Figure 7:
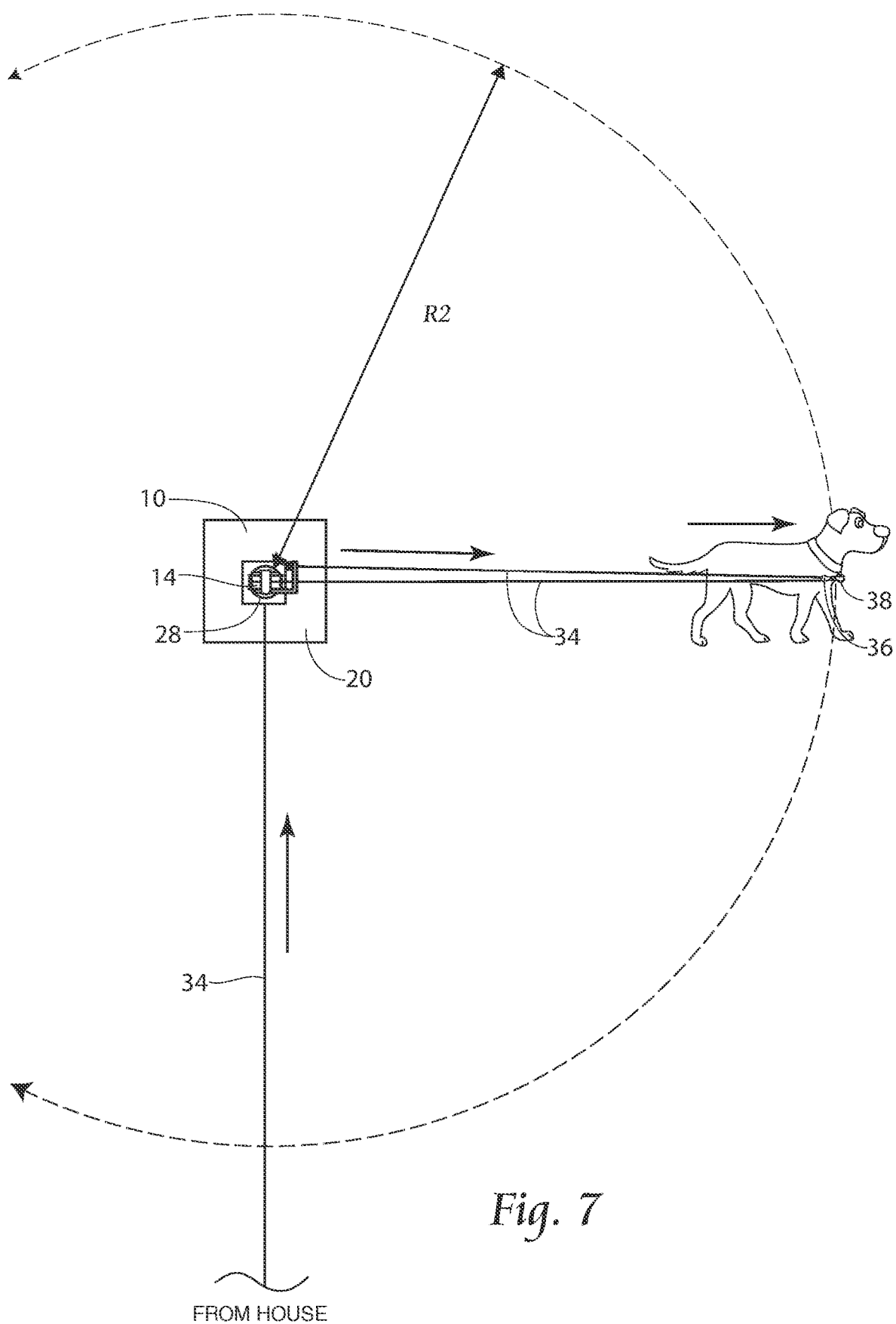
FIG. 7 is a top view thereof, the pet being allowed to travel away from the pet tether, increasing the radius of freedom of travel.

Referring now to FIG. 7, a top view of pet tether 10 of FIG. 1 is shown. Rope 34 can be paid out from the house in order to increase the radius of freedom of travel for the pet to R2 (greater than R), or the pet can be allowed to increase its radius of freedom of travel R if the first length of rope 34 to pet tether 10 is simply allowed by the user to be paid out by the pet. Conversely, the radius of freedom of travel R for the pet can be decreased by pulling on the first length of rope 34 (between the house and pet tether 10). If the pet resists leaving the house, one can simply pull on the first length of rope 34 after hooking the rope 34 (via carabiner 38) onto the pet near the house, in order to decrease radius of freedom of travel R, thereby pulling the pet 34 towards pet tether 10 and controlling the radius of freedom of where the pet can travel when leashed. Friction free means (bearings) may be provided to assist manual adjustment of rope 34.

Figure 8:
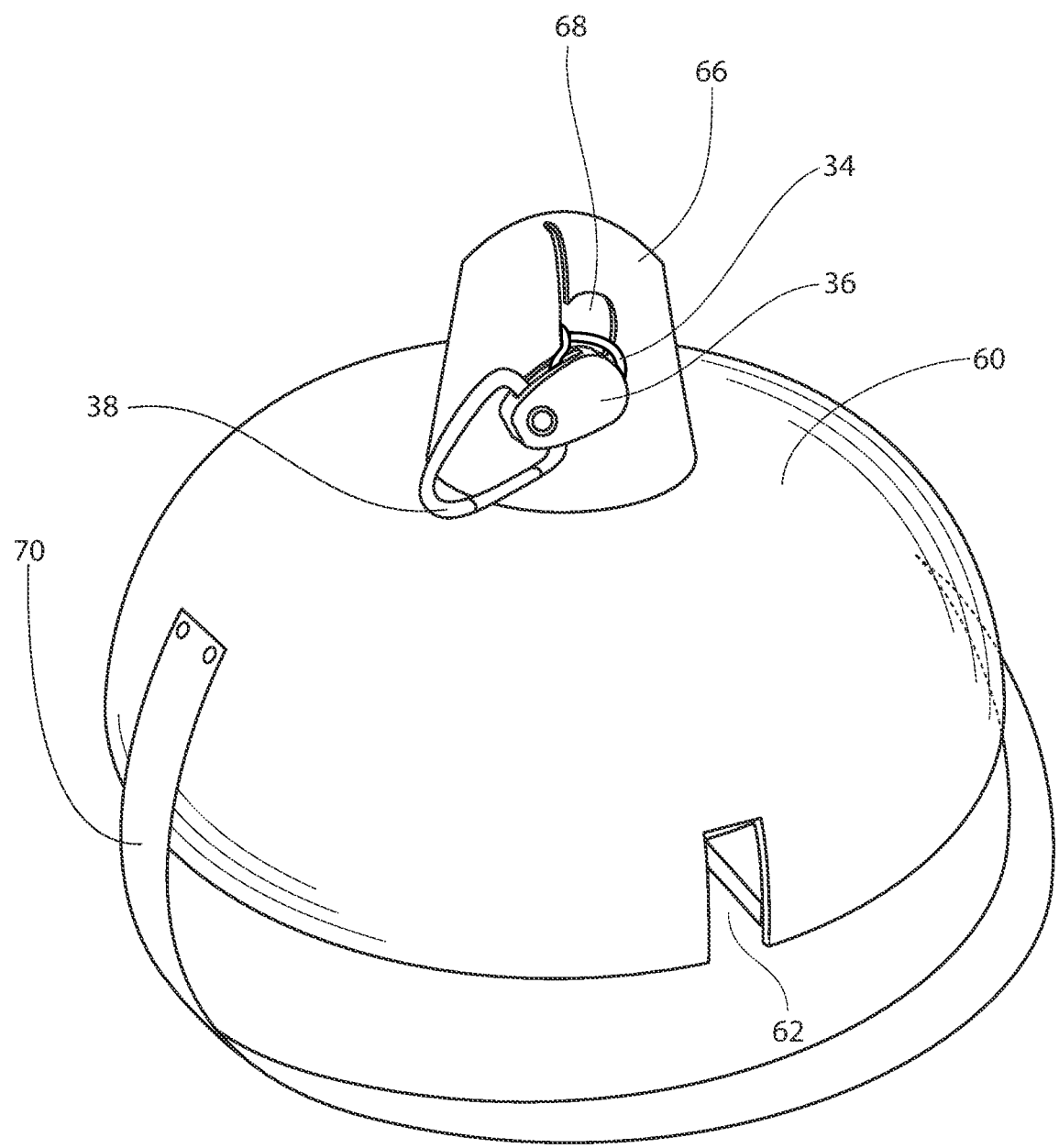
FIG. 8 is a perspective view of a dome/cap combination which can contain a pet tether.

Referring now to FIG. 8 a dome 60 and/or cap 66 can be provided to shield, protect and contain most elements of pet tether 10 within the dome 60/cap 66. In a preferred embodiment, portions of rope 34, pet pulley 36, and carabiner 38 would remain outside of the dome 60/cap 66, with the remaining elements of pet tether 10 protected within.

For instance, in a preferred embodiment, dome 60 may conceal elements of the pet tether 10 shown in FIG. 1 beneath caster base plate 30, including the legs 24, first pulley 12, fork 16, and base 18. Or, in the alternate embodiment described in FIG. 1A, tube 50 and associated elements may be concealed underneath dome 60. In a preferred embodiment, cap 66 is hollow and contains elements of pet tether 10 shown in FIG. 1 above caster base plate 30, such as rotating caster assembly 28, caster fork 26, second pulley 14, and tie off tab 40. Cap 66 is formed with cap slot 68 formed therein to allow pet pulley 36 and carabiner 38, and the portions of the rope 34 between pet tether 10 and pet pulley 36 and carabiner 38 to be positioned outside of cap 66.

A carrying strap 70 can be coupled to dome 60 to provide portability of pet tether 10. A user can transport dome 60 and pet tether 10 contained therein, by carrying strap 70.

A dome slot 62, preferably provided at a ground-level position of dome 60, is provided to accommodate the first length of rope 34, and particularly to allow rope 34 to travel in and out of dome 60 coupled to first pulley 12.

External lights may also be provided on pet tether 10 (not shown), for instance at dome 60, and these lights can also be directional lights to a collar tracking chip provided at the pet pulley 36, or elsewhere in the vicinity of the pet.

Figure 9:
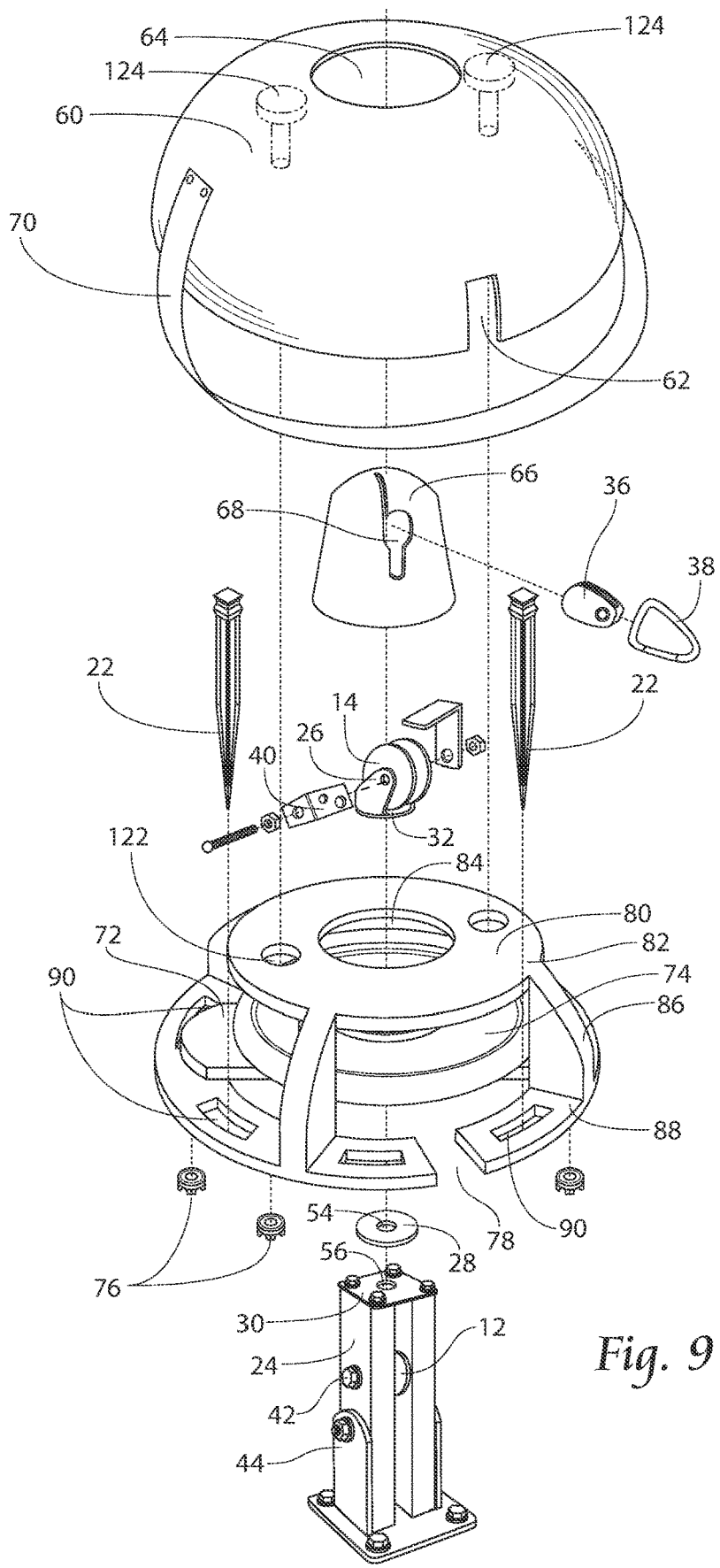
FIG. 9 is an exploded view of a pet tether and associated cap, dome, weighting system, and grounding frame which may be used in association with the pet tether.

Referring now to FIG. 9, an exploded view of pet tether 10 and associated support elements is shown. Beginning from the bottom (ground surface) up, pet tether 10, such as described in relation to FIG. 1, can be optionally be placed through bottom ring 88 of grounding frame 80, and a support board 72, which can optionally support weight(s) 74, which may comprise a ring shaped heavy weight (such as a weight lifting plate) with a hole formed therein to allow pet tether 10 to be placed therethrough. Support board 72 is slotted such that elements of pet tether 10 can fit therethrough, and so that side-to-side movement of support board 72 is allowed for installing and removing weight 74.

Optional weight(s) 74 may be used if the user does not wish stake pet tether 10 to the ground. For instance, weight(s) 74, if used, keep pet tether 10 in place on surfaces such as turf, playground, driveway, frozen lakes, beaches, or other areas which stakes 22 might not be desired or practical. Support board 72 distributes the weight of weight(s) 74 to a bottom ring 88 of grounding frame 80.

Caster base plate 30 has a void space 56 therethrough, and rotating caster assembly 28 has a void space 54 therethrough. A void space is also present through the caster yoke 32, but is not visible in this view. These voids accommodate rope 34 between first pulley 12 and second pulley 14.

Grounding frame 80 has three main components, a bottom ring 88, one or more vertical support braces 86, and top ring 82. Grounding frame 80 may be formed of unitary construction (e.g., molded as one piece), or may be assembled of constituent elements. Bottom ring 88 of grounding frame 80 preferably has a plurality of stake slots 90 formed therein, for placing stakes 22 through and into the ground surface. Optionally, studs or spikes 76 can be coupled to the bottom surface of bottom ring 88 (similarly to how golf spikes are attached to golf shoes) to provide additional traction for grounding frame 80 against the ground surface. The top surface of bottom ring 88 can carry support board 72. A bottom ring slot 78 may be provided to align with dome slot 62, allowing a path for entry/exit of rope 34 into and out of grounding frame 80 and dome 60, to first pulley 12.

Bottom ring 88 can carry support braces 86 to provide vertical separation between bottom ring 88 and a top ring 82 of grounding frame 80. Within this vertical separation, grounding frame 80 can receive support board 72, optional weight(s) 74, and the pulley 12 and its support structure (in this illustrated embodiment, legs 24).

Top ring 82 preferably is provided with void space 84 through which uppermost components of pet tether 10 extend. Atop a top surface of top ring 82, cap 66 can be rotatably held by grounding frame 80. Dome 60 is provided with dome void space 64 to receive cap 66 therethrough. Cap 66 can be coupled to dome 68 either by a conical geometry providing a bottom portion of cap 66 that does not fit upwardly through dome void space 64, or can be snap-fit thereto.

Dome 60 preferably contains, on an inner surface thereof, male couplings 124 to couple with corresponding top ring female receivers 122 positioned in top ring 82, for coupling dome 60 to grounding frame 80. Of course, the male and female couplings could interchangeably occupy positions either within dome 60 or on the top ring 82.

Figure 10:
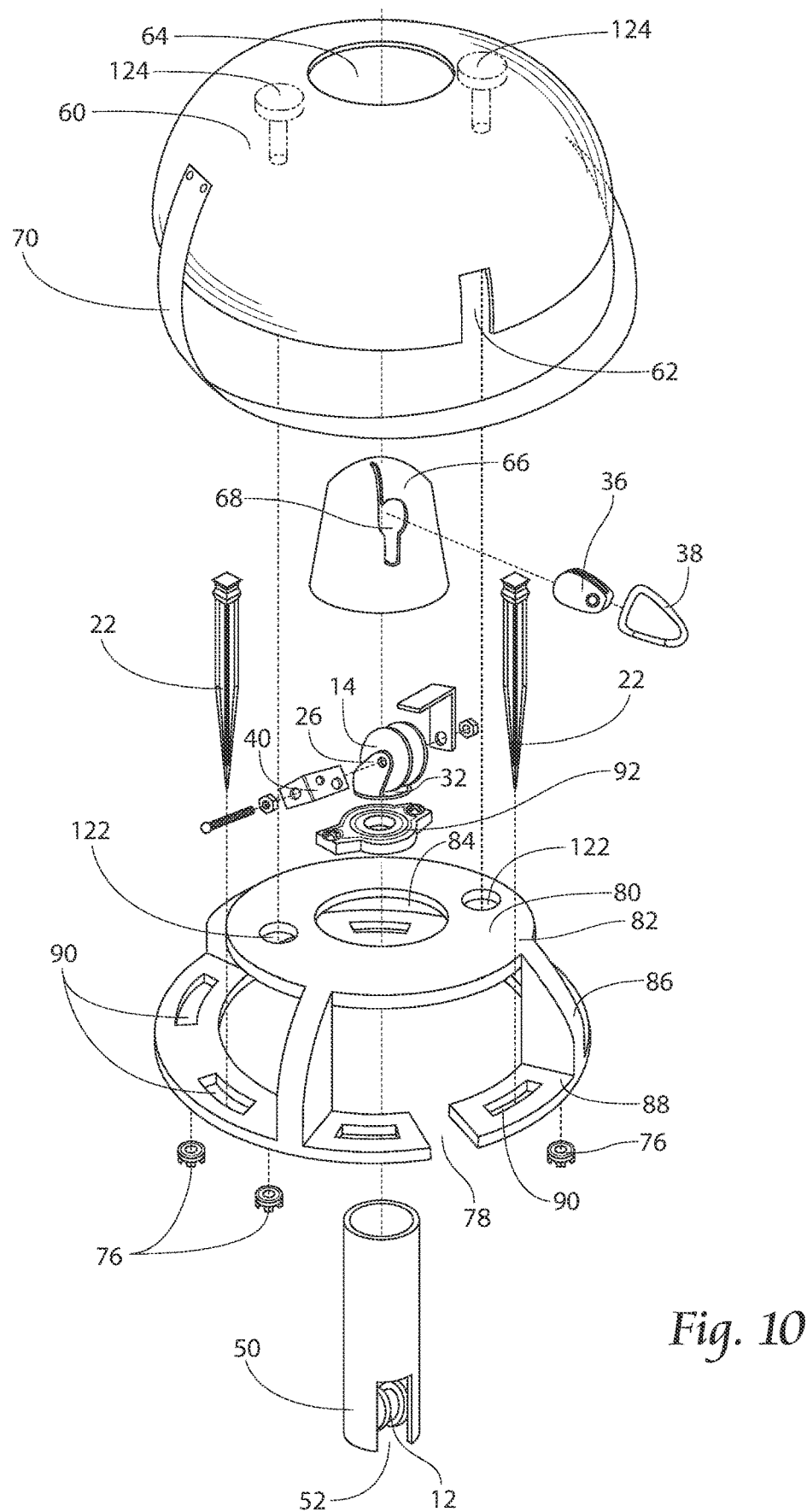
FIG. 10 is an exploded view of a first alternate embodiment of a pet tether, along with the associated cap, dome, and grounding frame.

Referring now to FIG. 10, an alternate embodiment of pet tether 10 is shown. In this embodiment, a stout hollow tube 50 takes the place of legs 24. Again in this arrangement, first pulley 12 is positioned at or within a bottom portion in an interior of hollow tube 50, and is carried in the interior of hollow tube 50 by any means (nuts, bolts, axles, etc.). A tube cutout 52 exposes pulley 12 and allows rope 34 to enter tube 50 and extend around pulley 12 and upwards as previously described. Tube 50, although shown as circular in cross section, could take any cross-sectional shape, and tube 50 could also be provided with a base structure 18 as described in relation to FIG. 1. In this embodiment, rotating caster assembly 28 (and optionally caster base plate 30) can be positioned at a top of tube 50 or tube 50 can be coupled to a grounding frame 80 provided with a flange mount bearing unit 92.

In a preferred embodiment, a flange mount bearing unit 92 is positioned within top ring void space 84 of grounding frame 80. Rope 34 (not shown) enters tube cutout 52 preferably near ground level, about pulley 12, and extends vertically through tube 50, and through flange mount bearing unit 92 and therefore top ring void space 84, to and through a void space in caster yoke 32 carried by flange mount bearing unit 92. Rope 34 then extends about a peripheral portion of upper pulley 14, then to and from pet pulley 36 carrying carabiner 38 as previously described.

Figure 6:
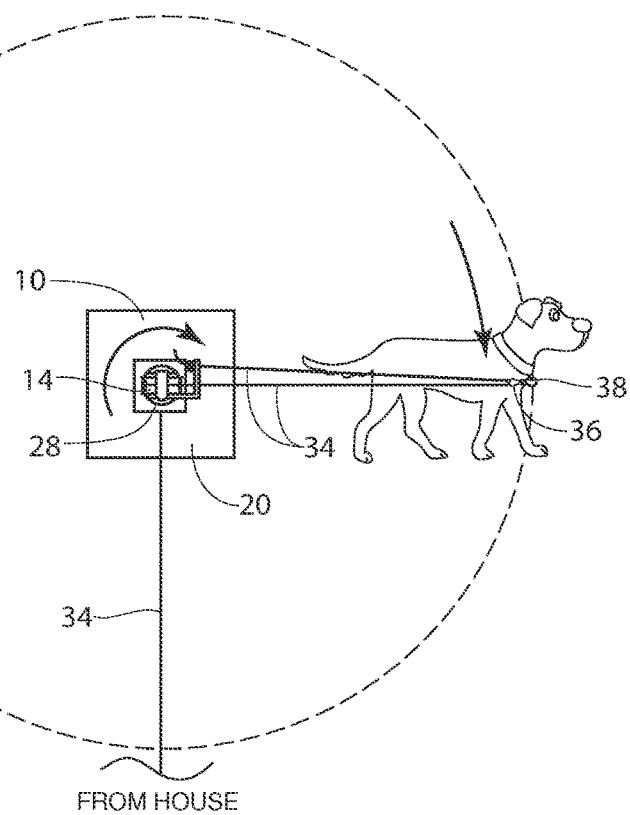
FIG. 6 is a top view thereof, the pet traveling about the pet tether.
Figure 11:
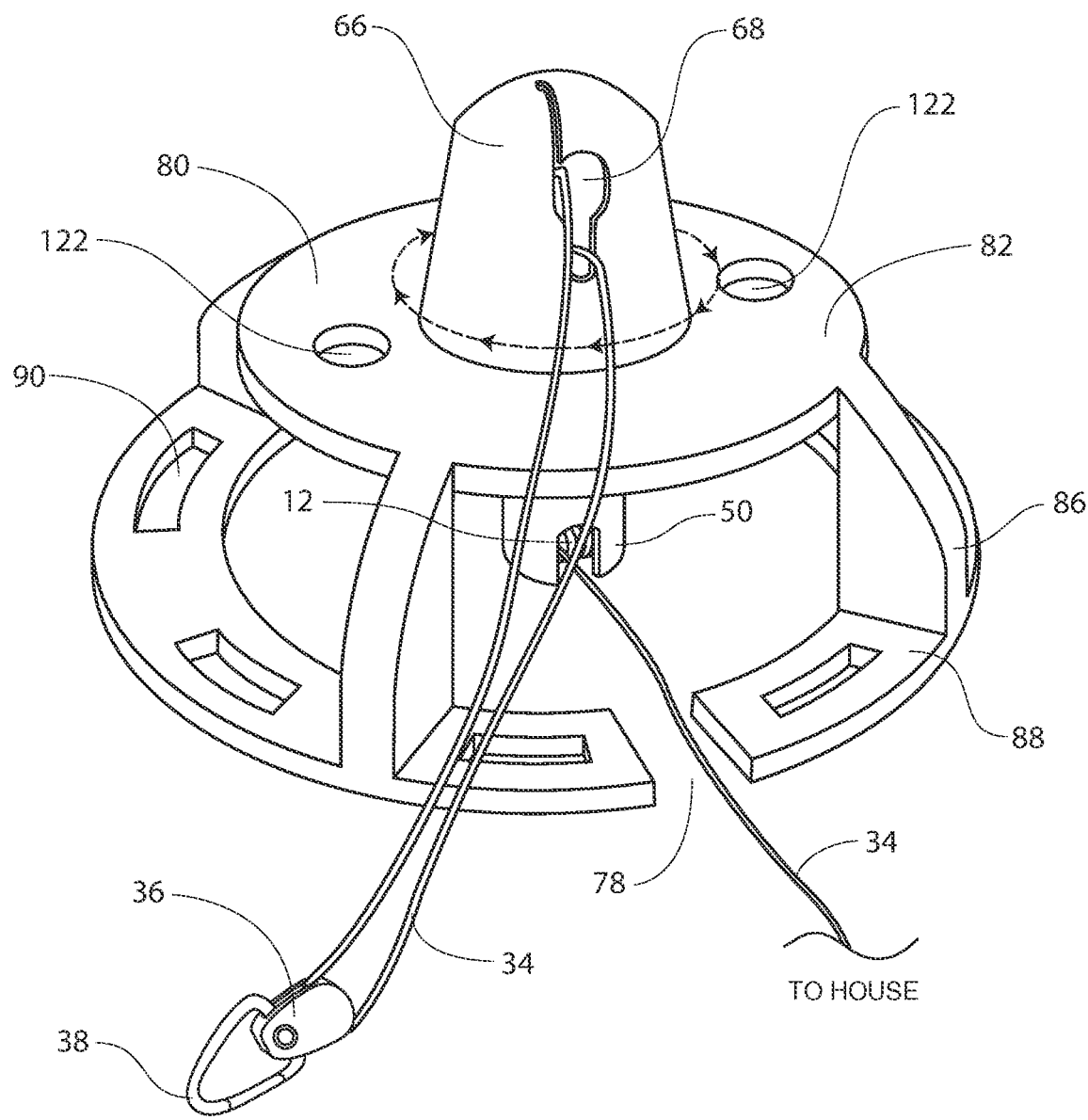
FIG. 11 is a perspective view of a pet tether and associated cap displaying rotational capabilities of the cap.

Referring now to FIG. 11, cap 66 is rotatably positioned atop top ring 82. Rotation of rope 34 about an axis of pet tether 10 (as shown in FIG. 6) repositions both second pulley 14 (within cap 66 and concealed from view in FIG. 11), as well as cap 66, which rotates relative to dome 60 (not shown in FIG. 11) which preferably remains stationary during rotation of cap 66.

Figure 12:
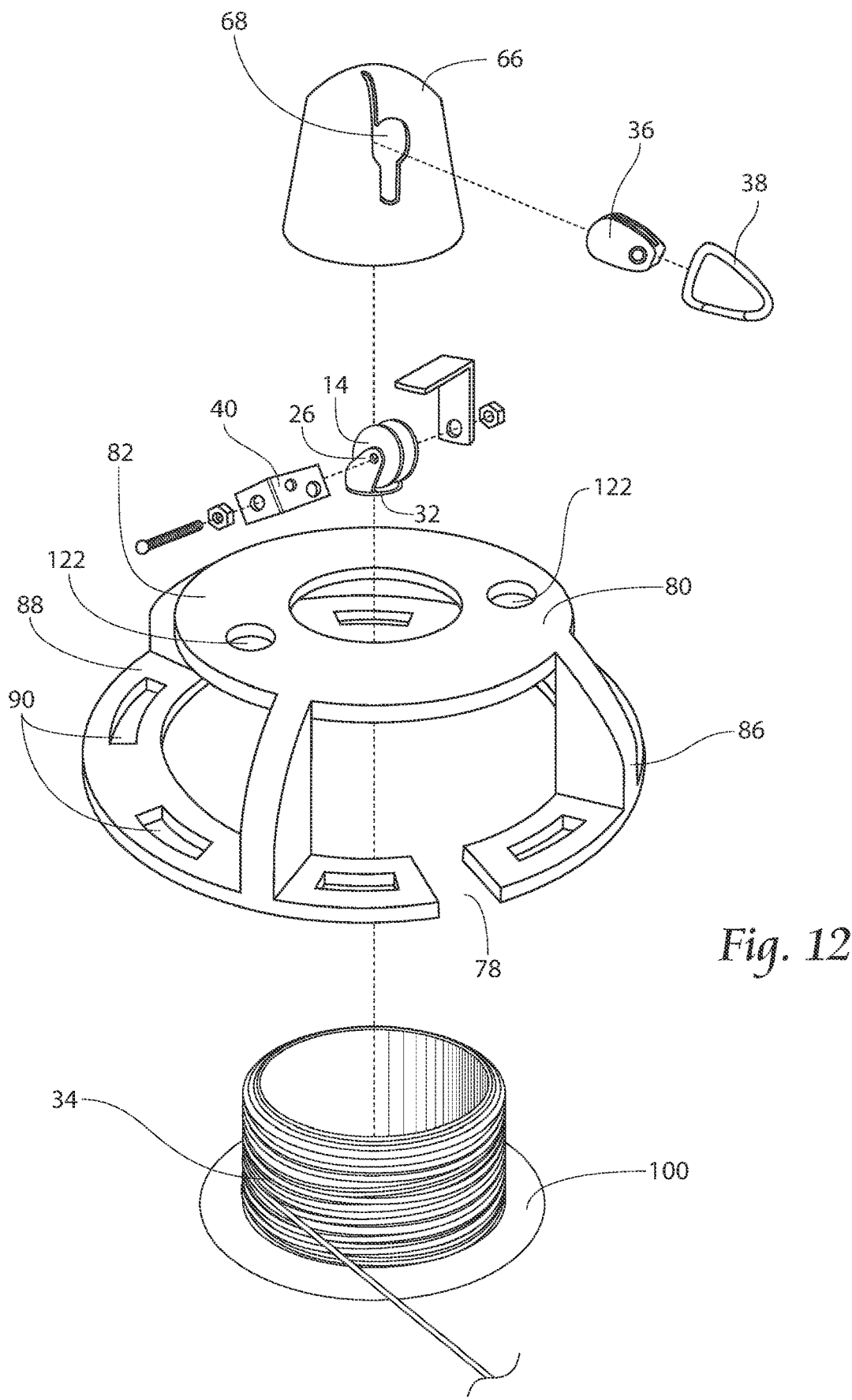
FIG. 12 is an perspective view of a second alternate embodiment of a pet tether, along with the associated cap, and grounding frame.

Referring now to FIG. 12, a second alternate embodiment of pet tether 10 is shown. In this embodiment, a retractable spool/reel combination 100 is provided to feed out and retract rope 34. A simple hand crank (not shown) may be provided to reel in rope 34 when desired, or an automatically rewindable hose reel can be used, such as disclosed in U.S. Pat. No. 4,813,627 to Nelson, which is incorporated herein by reference. A self-tensioning and rewinding least, such as that disclosed in U.S. Pat. No. 3,123,052 to Marshall, incorporated by reference, may also be used. A locking pin (not shown) may be provided to stop spool/reel combination 100 from unwind when deployed.

A motorized rewindable hose reel can also be used (not shown), in which case remote control of radius of freedom of travel R can be provided, for instance by an app communicatively coupled with the motor, for instance via Bluetooth or WiFi. In a motorized hose reel or externally lit embodiment, rechargeable batteries can be provided (preferably positioned within dome 60 or coupled to grounding frame 80, the batteries provided to power the electrical components, and recharging can be done with conventional plug-in charging, or with solar panels carried by pet tether 10, for instance at dome 60. Pet tether 10 may also be provided with an audio speaker for generating pet commands, or music (not shown).

Figure 13:
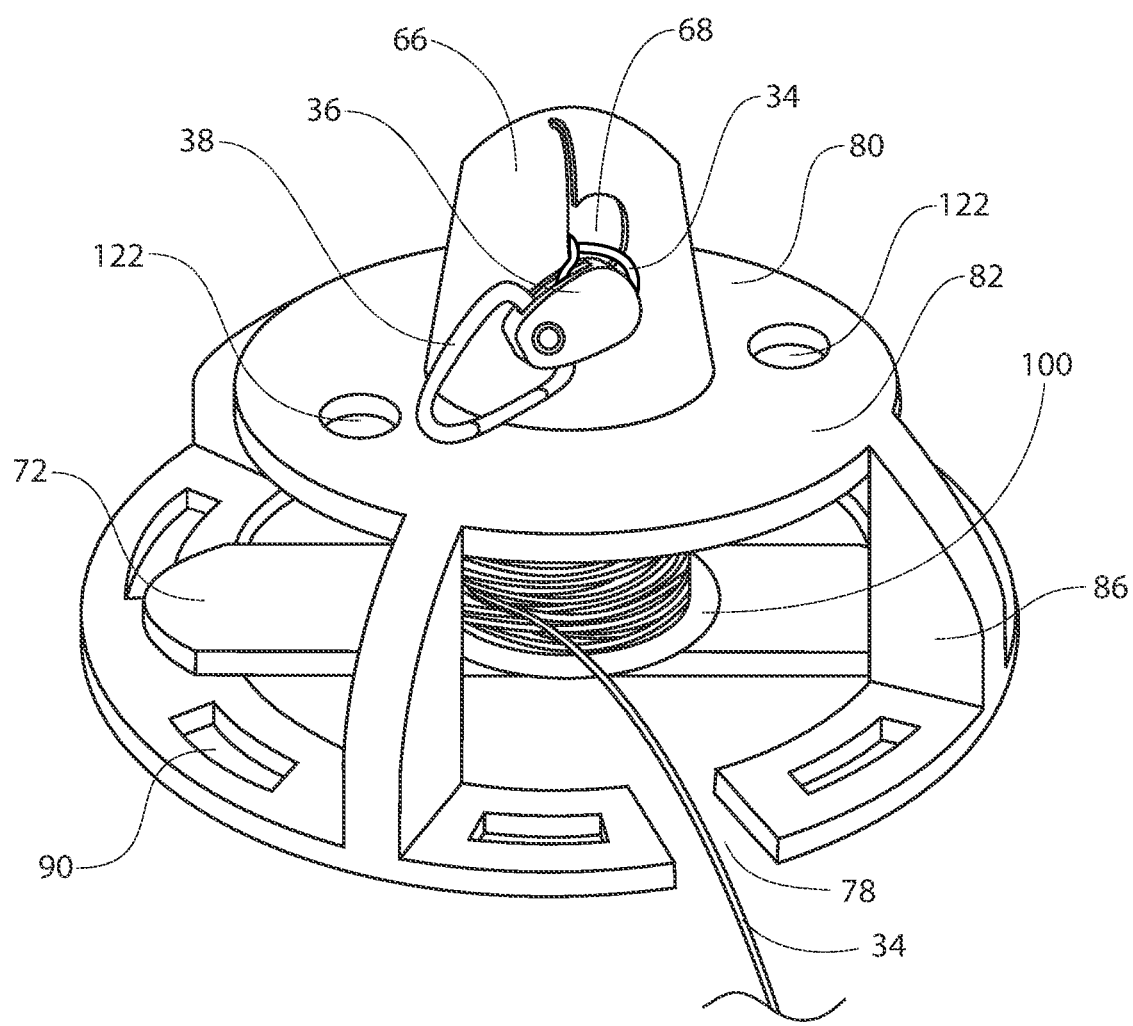
FIG. 13 is a perspective view thereof.

Referring now to FIG. 13, in a preferred embodiment, reel 100 can be supported by support board 72 within grounding frame 80.

Figure 14:
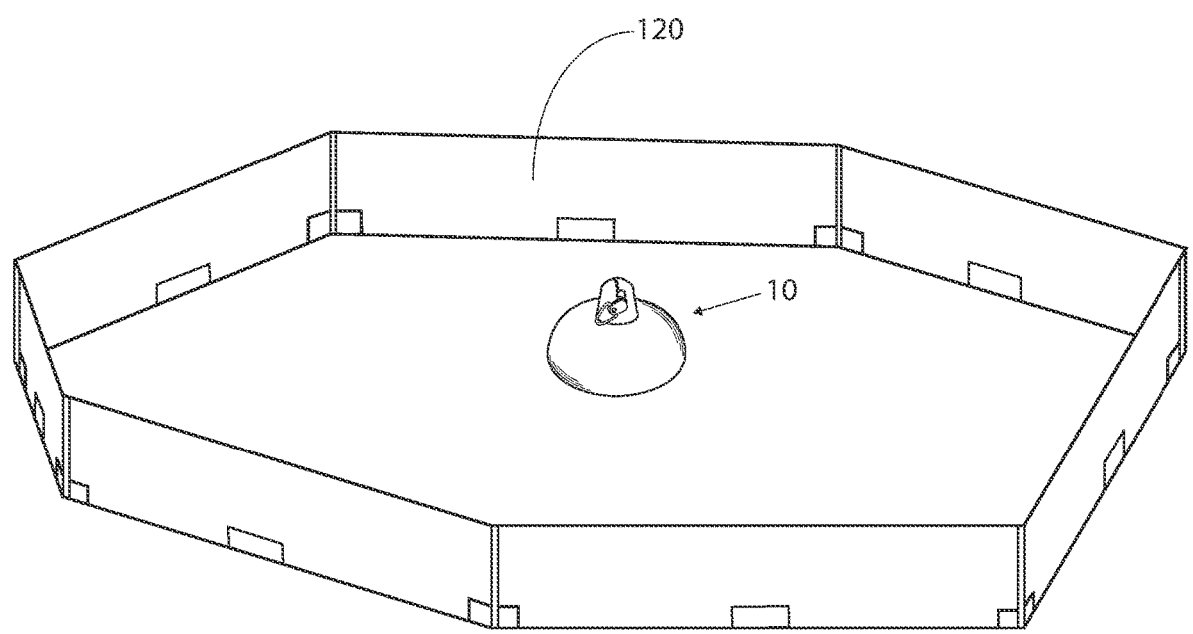
FIG. 14 is a perspective view of a pet entertainment center with a pet tether positioned therein.

Referring now to FIG. 14, a pet entertainment center is provided. In this embodiment, pet tether 10 is positioned within a structure 120, such as a fence, an empty pool, or an ice rink. Pet tether 10 is placed inside structure 120, preferably without spikes, and with the weighted embodiment. Toys and obstacles can be placed within structure 120 for pet entertainment.

Figure 15:
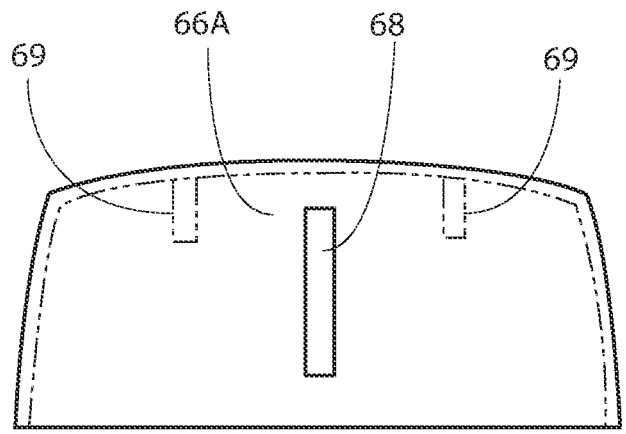
FIG. 15 is a perspective view of an alternate embodiment of a cap structure for use with the pet tether.
Figure 16:
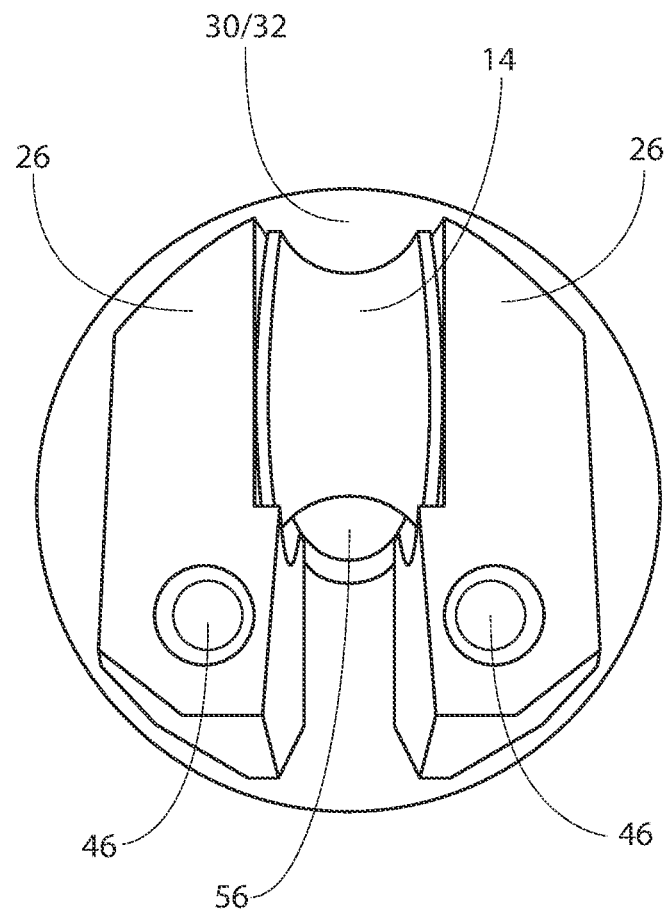
FIG. 16 is a top view of an alternate embodiment of a fork and upper pulley arrangement.

Referring now to FIG. 15, a perspective view of an alternate embodiment of a cap structure 66' with cap slot 68 is shown. As will be appreciated, the shape of cap 66 (and its alternate embodiment cap 66') can vary. Male protrusions 69 are provided on cap structure 66' for mating with female void spaces 46 of caster fork 26 (see FIG. 16). As shown in FIG. 16, a top view of an alternate embodiment of a fork 26 and upper pulley 14 arrangement is shown. In this arrangement, forks 26 are provided with the female void spaces 46 to mate with the male protrusions 69 of cap 66' (of course the male/female parts can be reversed). Caster assembly void space 56 receives rope 34 (not shown), and rope 34 is positioned about upper pulley 14 as previously described. In the fork 26 configuration shown in FIG. 16, forks 26 can be contoured both vertically and circumferentially to provide a tight fit with cap structure 66' when cap structure 66' is coupled with forks 26.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A pet tether comprising:
    a rope;
    a support structure carrying a first rope guide, said first rope guide carrying said rope;
    a second rope guide spaced apart from said first rope guide, said second rope guide carried by said support structure and receiving said rope from said first rope guide;
    said rope exiting said second rope guide and carrying a coupling structure;
    at least one of said first and said second rope guides comprising a spinning rope guide, said spinning rope guide spinning in relation to said support structure, and said spinning rope guide spinning about a substantially vertical axis in response to rotation of said rope about said axis;
    said rope comprising a first portion between a first end of said rope and extending to said support structure;
    said rope further comprising a second portion between said first rope guide and said second rope guide;
    said rope further comprising a third portion between said second rope guide and said coupling structure, said third portion comprising a variable length to provide a radius of travel;
    said radius of travel variable in response to increasing or decreasing a length of said first portion of said rope from outside said radius of travel, and variable in response to increasing or decreasing a length of said third portion of said rope, and wherein at least a portion of the radius of travel is defined within a horizontal plane.

2. The pet tether according to claim 1, said first rope guide comprising a first pulley rotatably coupled to said support structure about a first substantially horizontal axis.

3. The pet tether according to claim 1, said second rope guide comprising a second pulley rotatably coupled to said support structure about a second substantially horizontal axis.

4. The pet tether according to claim 1, said second rope guide carried by a caster assembly coupled to said support structure, said caster assembly spinning about said substantially vertical axis.

5. The pet tether according to claim 1, said rope comprising a first length of said rope between a proximal portion of said rope and said first rope guide, a second length of said rope between said first rope guide and said second rope guide, and a third length of said rope from said second rope guide to a pet collar coupling for releasably securing said pet to said pet tether.

6. The pet tether according to claim 5, wherein said pet collar coupling carries a third pulley, said rope further comprising a fourth length of said rope from said third pulley to said pet tether, said fourth length of said rope fixedly coupled to at least one of said second rope guide and said support structure.

7. The pet tether according to claim 5, wherein pulling on said first length of rope away from said first rope guide shortens said third length of said rope.

8. The pet tether according to claim 1, said pet tether further comprising a base structure coupled to said support structure, at least one of said support structure and said base structure selectively coupled to a ground surface.

9. The pet tether according to claim 1, wherein said support structure comprises a tube.

10. The pet tether according to claim 1, wherein said support structure comprises a leg.

11. The pet tether according to claim 1, wherein said support structure carries said second rope guide at a top portion of said support structure.

12. The pet tether according to claim 1, said support structure positioned within a dome.

13. The pet tether according to claim 12, said dome comprising a slot for accommodating said rope, said slot positioned proximal to a bottom portion of said dome.

14. The pet tether according to claim 1, said second rope guide positioned within a cap rotatably carried within a void space of a dome.

15. The pet tether according to claim 14, said rope exiting said cap.

16. The pet tether according to claim 1, said pet tether coupled to a grounding frame, said grounding frame comprising a stake slot through which a stake can couple said grounding frame to a ground surface.

17. The pet tether according to claim 16, said grounding frame further comprising a bottom ring with said stake slot formed therein, and a top ring vertically spaced apart from and coupled to said bottom ring, said top ring comprising a void space.

18. The pet tether according to claim 17, said grounding frame top ring carrying a bearing.

19. The pet tether according to claim 16, said grounding frame selectively carrying a weight.

20. The pet tether according to claim 16, said grounding frame coupled to a dome.

* * * * *